United States Patent
Fan et al.

(10) Patent No.: US 10,974,900 B2
(45) Date of Patent: Apr. 13, 2021

(54) ITEM PICKING AND REPLENISHMENT METHOD, PICKING VEHICLE AND ITEM PICKING AND REPLENISHMENT SYSTEM

(71) Applicant: Industrial Technology Research Institute, Hsinchu (TW)

(72) Inventors: Chen-Jyh Fan, Qionglin Township (TW); Wan-Ru Huang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 211 days.

(21) Appl. No.: 16/232,719

(22) Filed: Dec. 26, 2018

(65) Prior Publication Data
US 2020/0087071 A1    Mar. 19, 2020

(30) Foreign Application Priority Data
Sep. 14, 2018    (TW) .............................. 107132455 A

(51) Int. Cl.
*B65G 1/137*    (2006.01)
(52) U.S. Cl.
CPC .... *B65G 1/1373* (2013.01); *B65G 2203/0216* (2013.01); *B65G 2203/041* (2013.01)
(58) Field of Classification Search
CPC .......... B65G 1/1373; B65G 2203/0216; B65G 2203/041
USPC .................................................. 700/213–230
See application file for complete search history.

(56) References Cited

U.S. PATENT DOCUMENTS

| | | | | |
|---|---|---|---|---|
| 3,750,804 A | * | 8/1973 | Lemelson ........... | G07F 11/1657 414/276 |
| 4,056,201 A | * | 11/1977 | Giros .................. | B65G 1/0407 414/281 |
| 4,203,696 A | * | 5/1980 | Lindberg ................. | A21B 3/07 414/277 |
| 5,380,139 A | * | 1/1995 | Pohjonen ............. | B65G 1/0435 414/273 |

(Continued)

FOREIGN PATENT DOCUMENTS

| CN | 103171851 A | 6/2013 |
|---|---|---|
| CN | 104555222 A | 4/2015 |

(Continued)

OTHER PUBLICATIONS

Taiwanese Office Action and Search Report for Taiwanese Application No. 107132455, dated Aug. 8, 2019.

*Primary Examiner* — Michael Collins
(74) *Attorney, Agent, or Firm* — Birch, Stewart, Kolasch & Birch, LLP

(57) ABSTRACT

An item picking and replenishment method is provided. According to the item picking and replenishment method, an item position corresponding to at least one item is output according to an order by a host, and the item position is received by a processing unit of a picking vehicle. A moving signal is generated by the processing unit according to a current position of the picking vehicle and the item position. A rotary encoder of the picking vehicle is used to move the picking vehicle to the item position according to the moving signal. The item is obtained from a shelf by an insertion fork of the picking vehicle. The insertion fork is disposed on a placement layer of a placement shelf, and the placement layer is a tilted layer.

20 Claims, 14 Drawing Sheets

(56) References Cited

U.S. PATENT DOCUMENTS

| | | | |
|---|---|---|---|
| 5,513,936 A * | 5/1996 | Dean | B65G 1/08 414/273 |
| 7,413,398 B2 * | 8/2008 | Banged | E21B 19/165 414/745.2 |
| 8,670,861 B2 | 3/2014 | Yoshinaga | |
| 8,965,561 B2 | 2/2015 | Jacobus et al. | |
| 9,230,236 B2 | 1/2016 | Villamar | |
| 9,422,108 B2 | 8/2016 | Hognaland | |
| 9,823,659 B2 | 11/2017 | Holmberg et al. | |
| 9,856,083 B2 * | 1/2018 | Conrad | B65G 1/0485 |
| 10,000,336 B2 * | 6/2018 | Poulin | B65G 1/0435 |
| 2004/0083025 A1 * | 4/2004 | Yamanouchi | B66F 9/0755 700/213 |
| 2007/0237610 A1 * | 10/2007 | Uribe | B65G 1/1373 414/266 |
| 2013/0213913 A1 * | 8/2013 | Kohlgruber | B65D 88/129 211/85.8 |
| 2016/0236867 A1 | 8/2016 | Brazeau et al. | |

FOREIGN PATENT DOCUMENTS

| | | |
|---|---|---|
| CN | 104670773 A | 6/2015 |
| CN | 105059811 A | 11/2015 |
| CN | 106586358 A | 4/2017 |
| CN | 107226310 A | 10/2017 |
| TW | M327301 | 2/2008 |
| TW | I454413 B | 10/2014 |
| TW | I561449 B | 12/2016 |
| TW | I614195 B | 2/2018 |
| TW | 201825366 A | 7/2018 |

\* cited by examiner

ITEM PICKING AND REPLENISHMENT METHOD, PICKING VEHICLE AND ITEM PICKING AND REPLENISHMENT SYSTEM

CROSS REFERENCE TO RELATED APPLICATIONS

This application claims the benefit of Taiwan Patent Application No. 107132455, filed on Sep. 14, 2018, the entirety of which is incorporated by reference herein.

TECHNICAL FIELD

The disclosure relates to an item picking and replenishment method, an item picking vehicle, and an item picking and replenishment system.

BACKGROUND

With the rapid development of network e-commerce, users demand that the speed of distribution of goods becomes faster. However, with the diversification of goods, the volume of goods is different, and a fully automated picking process is difficult to achieve, especially considering the cost issue. The construction of existing automated storage systems is vast and expensive. For example, the robots used by Amazon are expensive. However, if the original manpower is used, there will be insufficient manpower and reduced efficiency during holidays when the volume of orders increases. Therefore, how to automate the item picking process at a lower cost is a problem that is currently being solved.

SUMMARY

An exemplary embodiment of an item picking and replenishment method is provided. The item picking and replenishment method comprises the steps of outputting an item position corresponding to at least one item according to an order by a host; receiving the item position by a processing unit of a picking vehicle; generating a moving signal according to a current position of the picking vehicle and the item position by the processing unit; using a rotary encoder of the picking vehicle to move the picking vehicle to the item position according to the moving signal; and obtaining the item from a shelf by an insertion fork of the picking vehicle. The insertion fork is disposed on a placement layer of a placement shelf, and the placement layer is a tilted layer.

An exemplary embodiment of a picking vehicle is provided. The picking vehicle comprises a vehicle body and a placement shelf. The vehicle body is disposed on a stage with a plurality of wheels. The vehicle body comprises a rotary encoder and a processing unit. The rotary encoder is connected to the plurality of wheels. The rotary encoder drives the plurality of wheels according to a moving signal to move the picking vehicle to an item position corresponding to at least one item. The processing unit is connected to the rotary encoder. The processing unit receives the item position from a host and generates the moving signal according to a current position of the picking vehicle and the item position. The placement shelf is composed of at least four brackets and a plurality of placement layers. Each placement layer comprises an insertion fork. The insertion fork obtains the item from at least one shelf, and each placement layer is a tilted layer.

An exemplary embodiment of an item picking and replenishment system is provided. The item picking and replenishment system comprises a host, a picking vehicle, and a tilted shelf where a plurality of items are placed. The host comprises a storage unit, a first processing unit, and a first communication interface. The storage unit stores item information and item positions that correspond to the plurality of items. The first processing unit is connected to the storage unit. The first processing unit receives an order including at least one of the plurality of items and generates a picking signal including at least one of the item positions according to the order and the item positions. The first communication interface outputs the picking signal. The picking vehicle is disposed on a stage with a plurality of wheels. The picking vehicle comprises a second communication interface, a rotary encoder, a second processing unit, and a placement shelf. The second communication interface is connected to the first communication interface to receive the picking signal. The rotary encoder is connected to the plurality of wheels. The rotary encoder drives the plurality of wheels according to a moving signal to move the picking vehicle to the at least one of the item positions. The second processing unit is connected to the rotary encoder and the second communication interface. The second processing unit generates the moving signal according to a current position of the picking vehicle and the at least one of the item positions. The placement shelf is composed of at least four brackets and a plurality of placement layers. Each placement layer comprises an insertion fork. The insertion fork obtains the at least one of the plurality of items from at least one shelf, and each placement layer is a tilted layer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

Other scopes for an item picking and replenishment method, a picking vehicle, and an item picking and replenishment system of the invention will be apparent from the detailed description provided below. The following detailed description and embodiments are intended to be illustrative and not intended to limit the scope of the invention.

The embodiments of the disclosure are provided to solve the problem of fully automated storage systems and excessive labor costs and further enhance picking.

Figure 1:
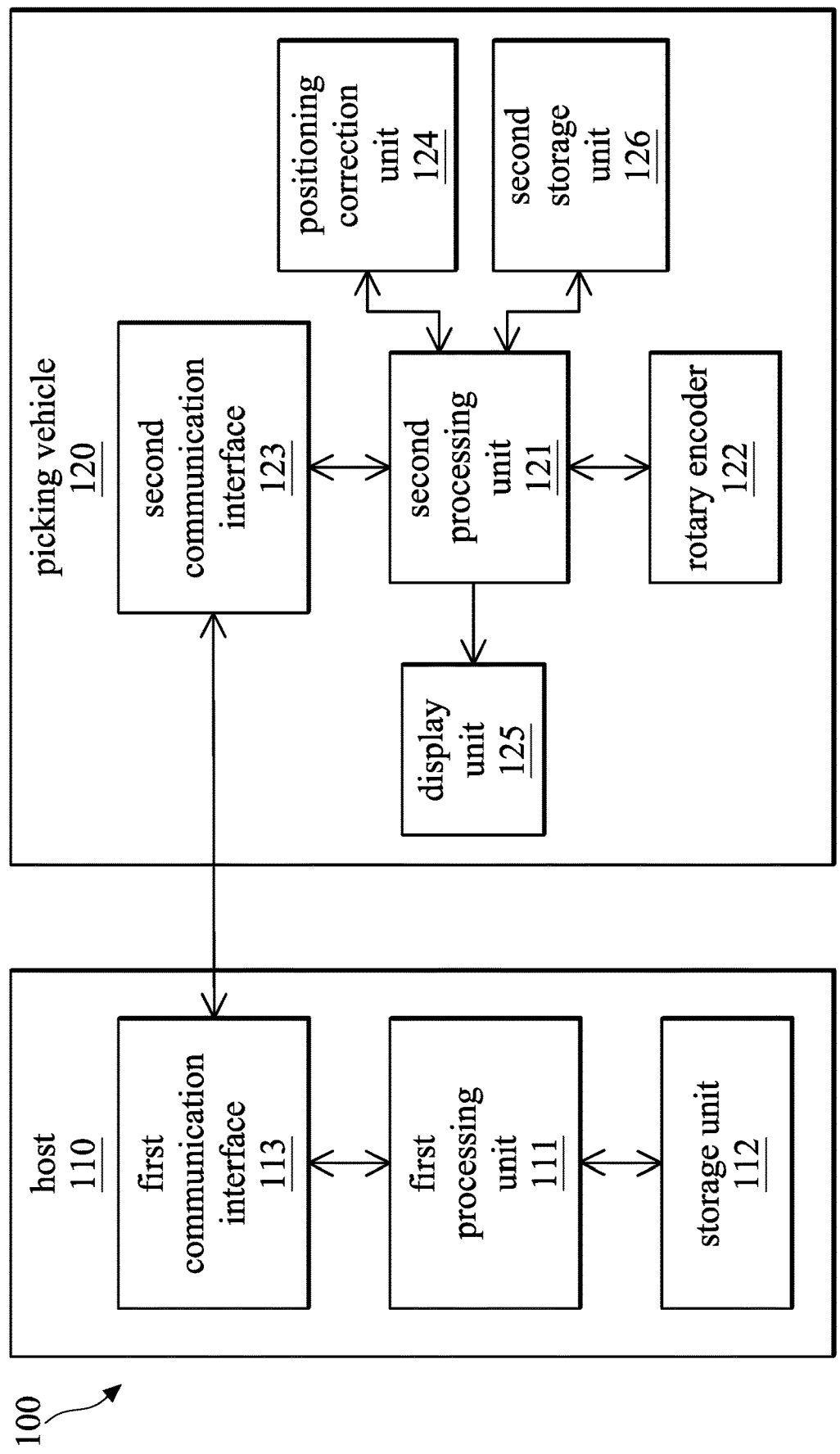
FIG. 1 shows an item picking and replenishment system according to an embodiment of the disclosure.

FIG. 1 shows a system structure diagram for implementing an item picking and replenishment method according to an embodiment of the disclosure. In this embodiment, the system structure may comprise a host 110 and at least one picking vehicle 120. The host 110 can be implemented in a desktop computer, a mobile phone, a tablet computer, or another electronic device with computing capabilities. The host 110 comprises at least a first processing unit 111, a storage unit 112, and a first communication interface 113. The first processing unit 111 may be implemented in various manners, such as a microprocessor, a dedicated hardware circuit, or a general purpose hardware (for example, a single processor, a multiprocessor with parallel processing capabilities, a graphics processor, or other processor capable of computing capabilities) and provide the functions described later when executing codes or software. The first processing unit 111 is mainly configured to receive order information (for example, to receive at least one order from at least one client terminal through the Internet). The first processing unit 111 finds an item and a corresponding position of the item according to the order information and outputs a corresponding control instruction to drive the picking vehicle 120 to perform a picking operation. The first storage unit 112 is configured to store data used or generated during the process of the item picking and replenishment method, such as information including the name, position, and barcode of an item and any information related to the item, which can be accessed by the first processing unit 111. The storage unit 112 can be a memory, a memory chip, or the like. The position of the item may include the coordinate of the item on the built-in map and a shelf code. The first communication interface 113 may be a wireless telecommunications module, a local area network (LAN) communication module, a wireless local area network communication module (WLAN), a wireless transmitter, a wireless receiver, or the like and configured to allow the first processing unit 111 to communicate with a picking vehicle or a cloud server (not shown) to exchange various order information or item information. The host 110 further comprises a display unit (not shown). The display unit may be a display panel (such as a thin film liquid-crystal display panel, an organic light emitting diode panel, or other panel with displaying capacities, etc.) for at least showing the order information and item information.

The picking vehicle 120 may comprises a second processing unit 121, rotary encoders 122, a second communication interface 123, a positioning correction unit 124, a display unit 125, and a second storage unit 126. The second processing unit 121 may be implemented in a various manners, such as a microprocessor, a dedicated hardware circuit, or a general purpose hardware (for example, a single processor, a multiprocessor with parallel processing capabilities, a graphics processor, or other processor capable of computing capabilities). The second processing unit 121 calculates a moving direction and a moving distance according to the current position of the picking vehicle 120 and the item positions and generates a corresponding moving signal. The rotary encoders 122 are electromechanical devices that can convert the rotation position or the rotation amount into an analog signal or a digital signal. The rotary encoders 122 are disposed on the unpowered wheels on the left and right sides of the picking vehicle 120. The second processing unit 121 may estimate the displacement of the picking vehicle 120 by the iterative algorithm based on the number of rotations returned from the two rotary encoders 122 to further obtain the current position of the picking vehicle 120 on the map.

For example, a new position coordinate corresponding to the picking vehicle 120 after the picking vehicle 120 tunes can be calculated by the following formula:

$$\theta = (360 * Co)/(2 * \pi 9(r + RC))$$

$$X1 = X0 + (r * \cos(\theta_0 * \pi/180)) - * r * \cos(\theta_1 * \pi/180))$$

wherein, X1 is the current position coordinate after the picking vehicle 120 tunes, X0 is the position coordinate before the picking vehicle 120 turns, $\theta_1$ is the angle corresponding to the rotary encoders 122 after turning, and $\theta_0$ is the angle corresponding to the rotary encoders 122 before turning, $\theta$ is the angle at which the picking vehicle 120 turns, and r is the radius of the wheels.

In addition, when the second processing unit 121 receives order information, the second processing unit 121 calculates the shortest moving path according to the position of the target item and the current position of the picking vehicle 120 and generates a corresponding driving signal, so that the rotary encoders 122 activates the wheels of the picking vehicle 120 to reach the picking position of the target item. The second communication interface 123 may be a wireless telecommunications module, a wireless transmitter, or a wireless receiver configured to communicate with the first communication interface 113 of the host 110 to receive the information related to the item. The positioning correction unit 124 may be a two-dimensional barcode scanner or a device that can capture two-dimensional or three-dimensional images for capturing an image that includes a two-dimensional barcode or a positioning point for the second processing unit 121 to correct the picking vehicle 120. The two-dimensional barcode and the positioning point are disposed on the fixed moving track. The position information corresponding to the two-dimensional barcode and the positioning-point image may be stored in the second storage unit 126 in advance and read by the second processing unit 121 as a basis for the correction. Moreover, the picking vehicle 120 may also perform the position correction operation by using other manners, such as a magnetic track, and, however, the present disclosure is not limited thereto. The display unit 125 is used to display the item information, such as the name and the position of the item, and, however, the present disclosure is not limited thereto. In addition, the second storage unit 126 may store all the moving paths of the picking vehicle 120. The second storage unit 126 may be a memory, a memory chip, or the like.

Figure 2:
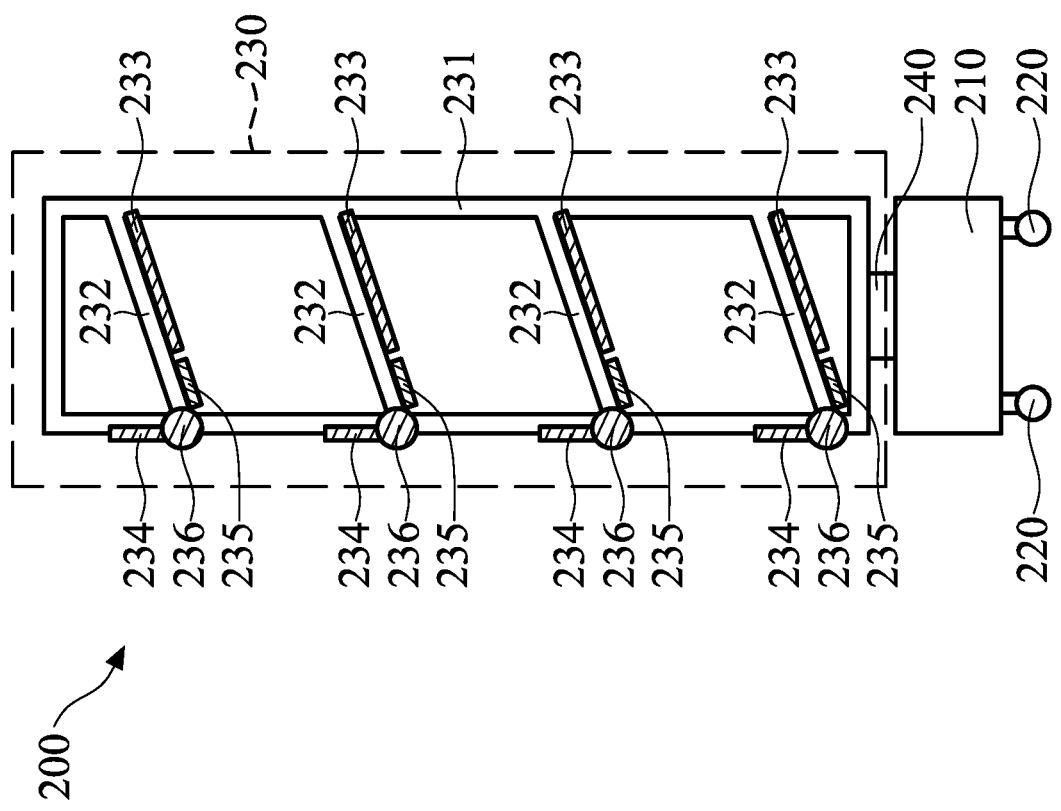
FIG. 2 is a schematic view showing a picking vehicle according to an embodiment of the disclosure.

FIG. 2 is a schematic view showing a picking vehicle according to an embodiment of the disclosure. As shown in FIG. 2, a picking vehicle 200 may comprise a vehicle body 210 and a placement shelf 230. The vehicle body 210 is disposed on a base comprising a plurality of wheels 220. The second processing unit 121, the rotary encoder 122, the second communication interface 123, and the positioning correction unit 124 are disposed in the vehicle body 210. The placement shelf 230 comprises at least four brackets 231 and a plurality of placement layers 232. Each of the placement layers 232 is provided as a tilted layer, and each placement layer 232 comprises at least one insertion fork 233 and a baffle 234. Each insertion fork 233 is connected to a pushing-and-drawing mechanism 235, and the pushing of the insertion fork 233 is controlled by driving the pushing mechanism through a motor. Each baffle 234 is connected to a worm driving mechanism 236 and driven by another motor to control the tilt angle of the baffle 234.

Figure 3:
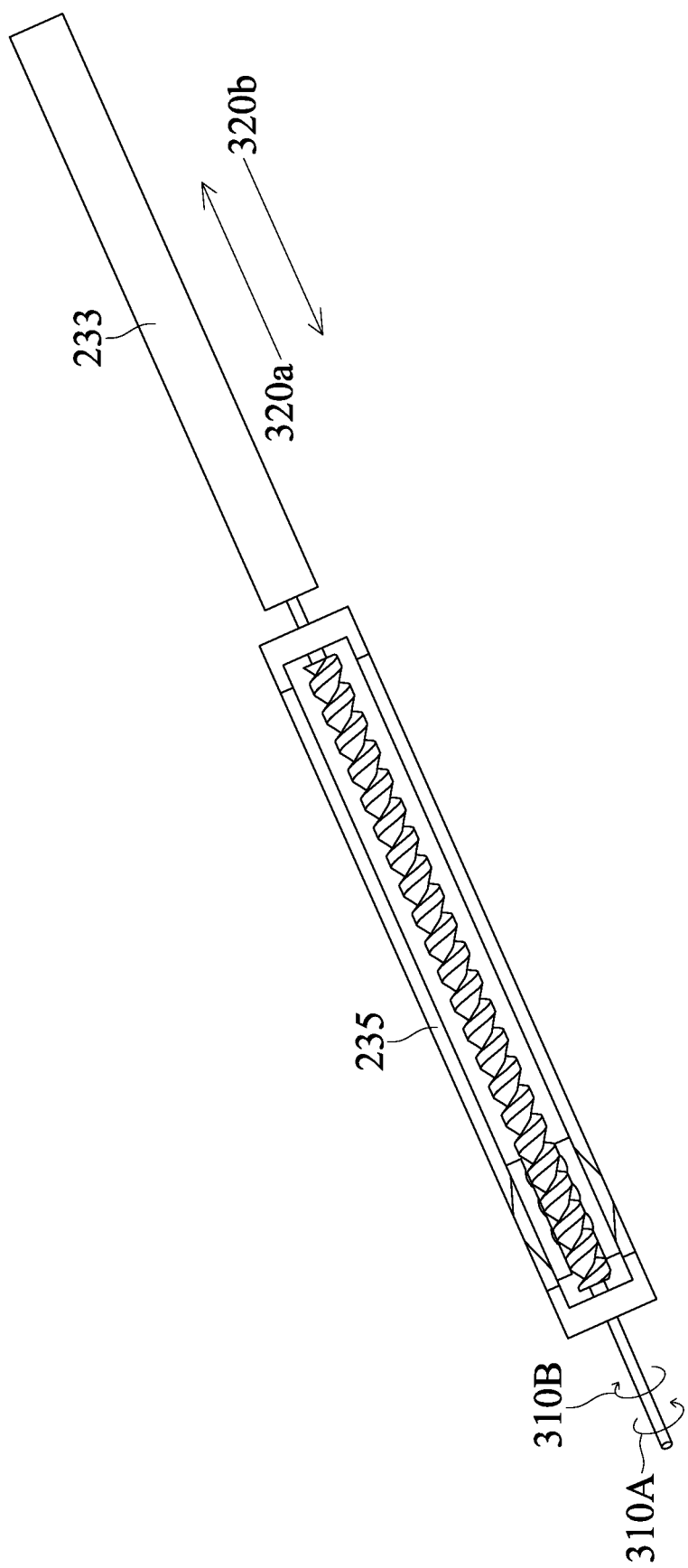
FIG. 3 is a schematic view showing a connection relationship between an insertion fork and a pushing-and-drawing mechanism according to an embodiment of the disclosure.

FIG. 3 is a schematic view showing a connection relationship between an insertion fork 233 and a pushing-and-drawing mechanism 235 according to an embodiment of the disclosure. As shown in FIG. 3, the pushing-and-drawing mechanism 235 may comprises a screw mechanism. One terminal of the screw mechanism is connected to a first motor (not shown) controlled by the second processing unit 121, and the other terminal thereof is connected to the insertion fork 233. When the first processing unit 121 drives the first motor to rotate in different directions, the insertion fork is pushed back and forth along the extending direction of the placement layer 232, so that the insertion fork is pushed below the item placed on the shelf or restored to its original position. For example, when the first motor drives the screw mechanism to rotate in the direction 310A shown in FIG. 3, the insertion fork 233 is extended in the direction 320a; conversely, when the first motor drives the screw mechanism to rotate in the direction 310B as shown in FIG. 3, the insertion fork 233 is be retracted in the direction 320b.

Figure 4:
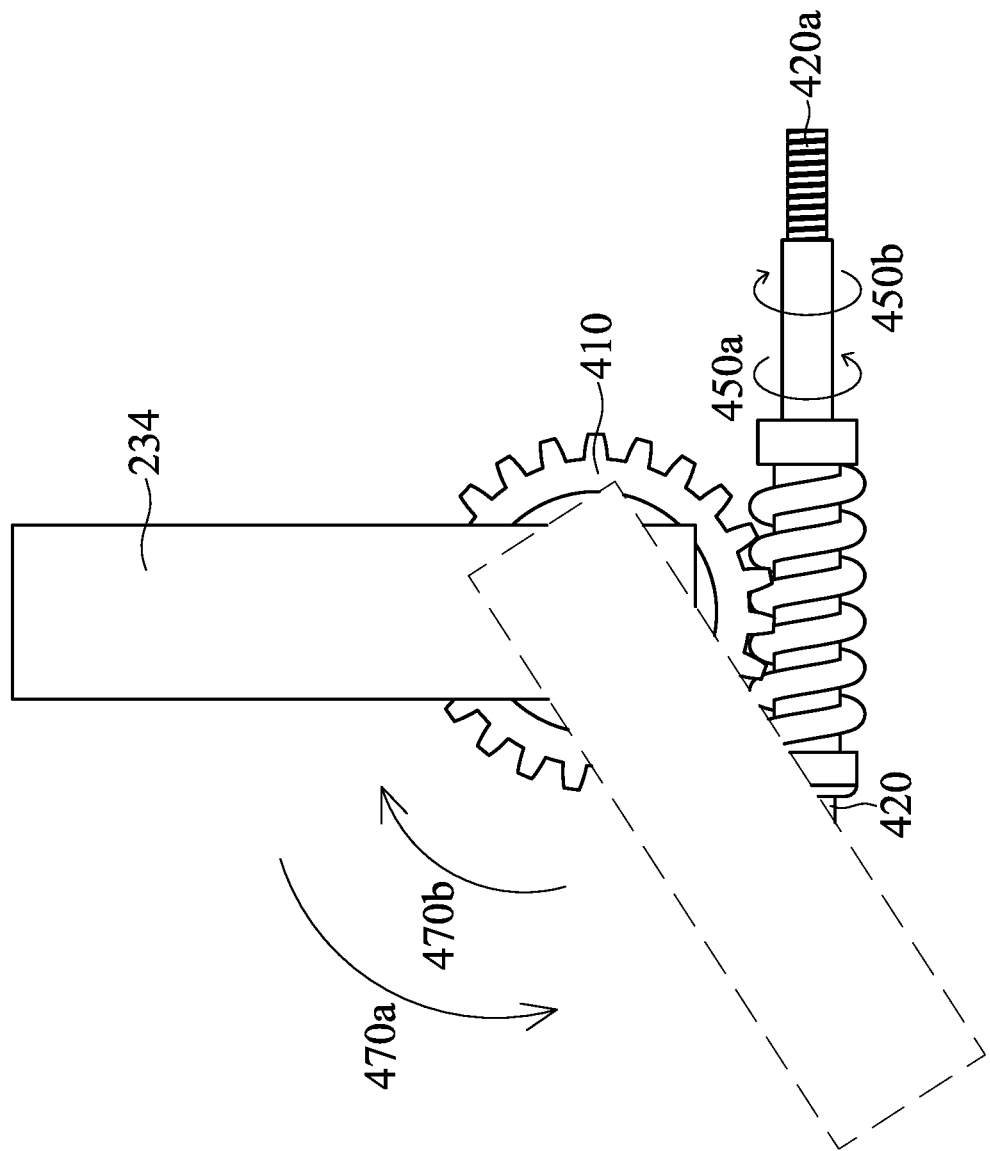
FIG. 4 is a schematic view showing a connection relationship between a baffle and a worm driving mechanism according to an embodiment of the disclosure.
Figure 5:
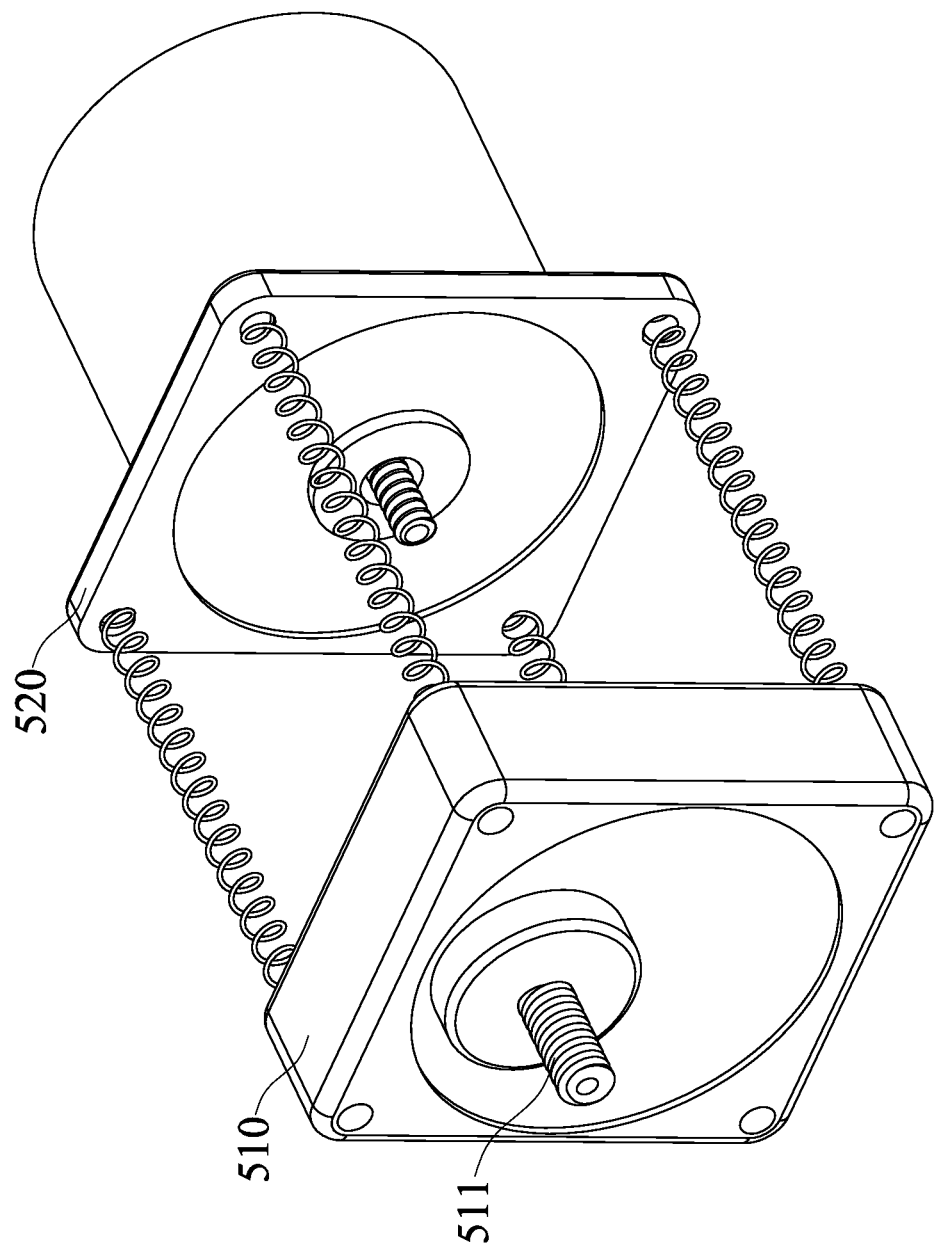
FIG. 5 is a schematic view showing a motor driving a worm according to an embodiment of the disclosure.

FIG. 4 is a schematic view showing a connection relationship between a baffle and a worm driving mechanism according to an embodiment of the disclosure. As shown in FIG. 4, the worm driving mechanism 236 comprises a worm gear 410 and a worm 420. The baffle 234 is affixed to the worm gear 410 with screws or the like. One terminal 420a of the worm 420 is connected to a second motor controlled by the second processing unit 121. For example, FIG. 5 is a schematic view showing a motor driving the worm 420 according to an embodiment of the disclosure. As shown in FIG. 5, one terminal 420a of the worm 420 is connected to one terminal 511 of a reducer 510. The second processing unit 121 drives the second motor 520 to drive the worm 420 through the reducer 510 to control the tilt degree of the baffle 234, thereby blocking the slipping of the item or replenish the shelf. For example, as shown in FIG. 4, when the second motor 520 drives the reducer 510 to drive the worm 420 to rotate in the direction indicated by the arrow 450a in FIG. 4, the worm gear 410 is driven to rotate in the direction of the arrow 470a in FIG. 4, such that the baffle 234 tilts forwardly, and the item placed on the placement layer 232 of the picking vehicle 200 can slide forward to replenish the shelf. On the other hand, when the second motor 520 drives the worm 420 to rotate in the direction indicated by the arrow 450b in FIG. 4, the worm gear 410 driven to rotate in the direction of the arrow 470b in FIG. 4, such that and the baffle 234 is restored from the tilted state to the original state to block the item from sliding.

Figure 6:
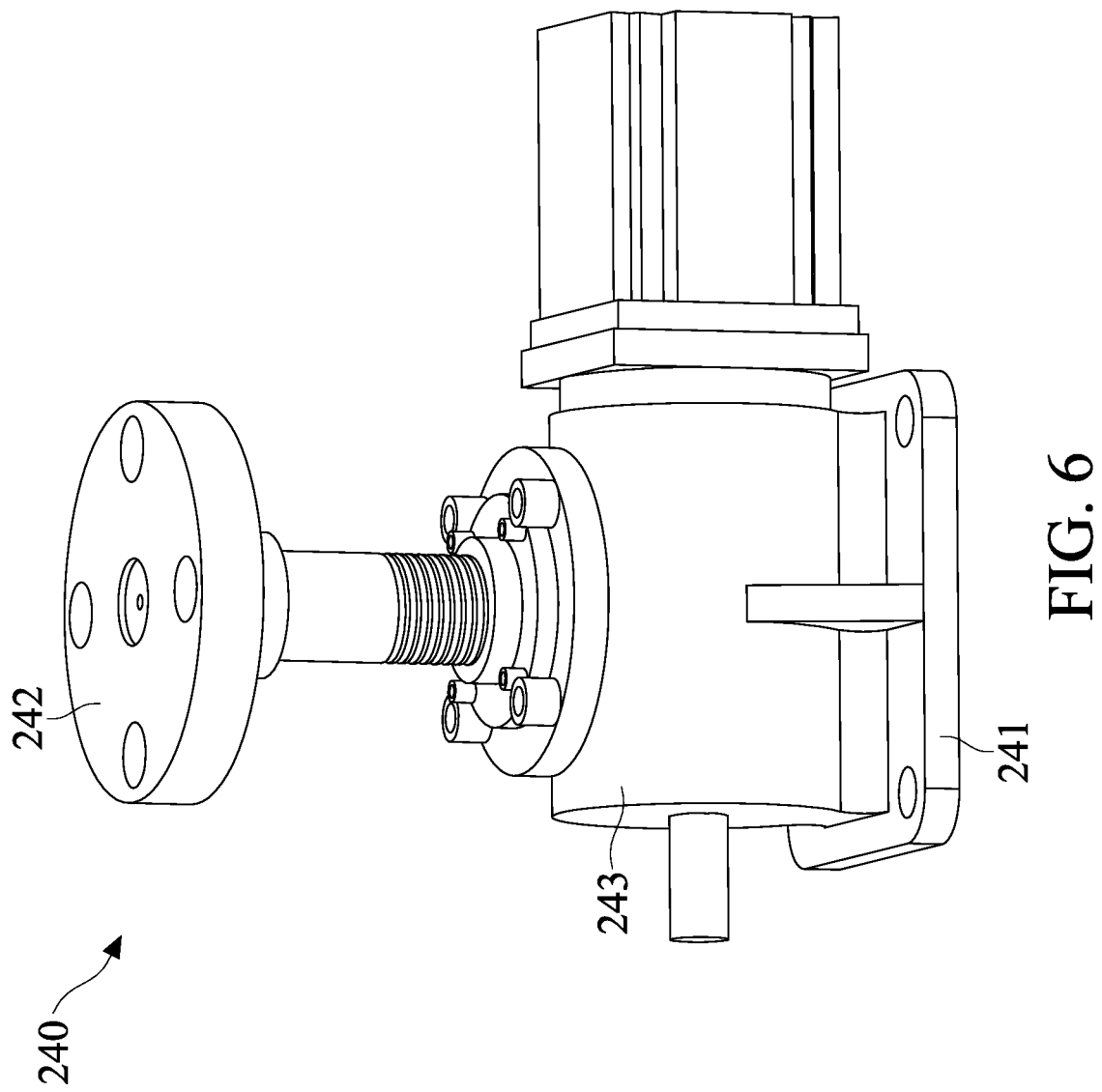
FIG. 6 is a schematic view showing a pushing-up mechanism according to an embodiment of the disclosure.

In addition, the picking vehicle 200 further comprises a pushing-up mechanism 240. As shown in FIG. 6, the pushing-up mechanism 240 comprises a bottom plate 241, a brake motor 243 disposed on the bottom plate 241, and a loading stage 242 disposed above the brake motor 243 and drives the brake motor 243 to push the loading stage 242 up and down. The bottom plate 241 of the pushing-up mechanism 240 is disposed on the vehicle body 210. The loading stage 242 is coupled to the placement shelf 230 and affixed to the bottom of the placement shelf 230, for example, by using screws. The pushing-up mechanism 240 can be an electric take-off and landing machine that may control the placement shelf 230 to rise or fall when the second processing unit 121 drives the brake motor 243. Each of the placement layers 232 may further comprise a picking confirmation unit (not shown) connected to the second processing unit 121. The picking confirmation unit may be a weight sensing unit disposed at the bottom of the placement layer 232 or a barcode scanner disposed on the front side of the placement layer 232. When the item is slid onto the placement layer 232 from a tilted shelf, whether the picking vehicle 200 has obtained the item can be determined by detecting the increment in weight or scanning the barcode.

Figure 7:
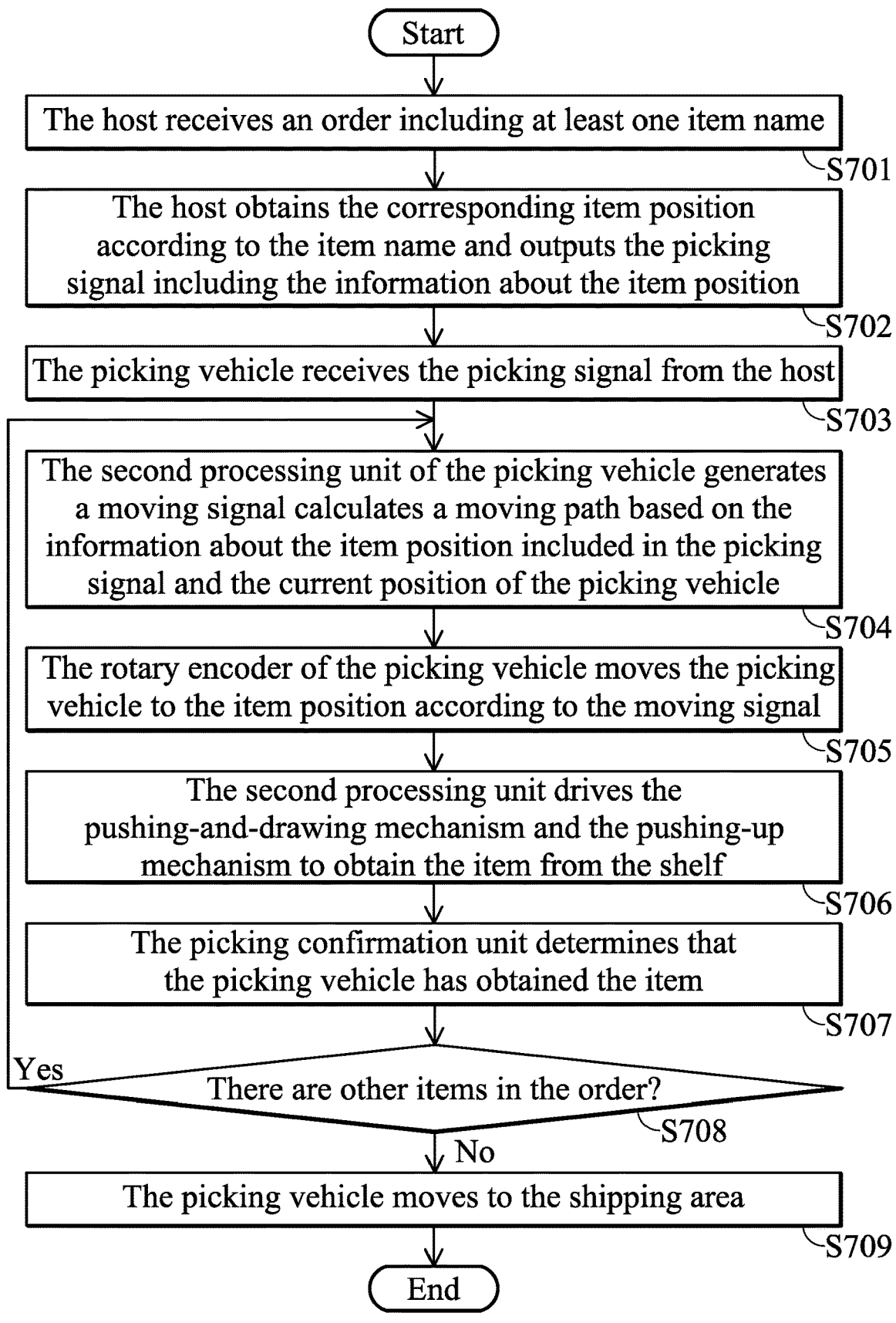
FIG. 7 is a flow chart showing an item picking and replenishment method according to an embodiment of the disclosure.

FIG. 7 is a flow chart showing an item picking and replenishment method according to an embodiment of the disclosure. In Step S701, the host 110 receives an order including at least one item name through the first communication interface 113. In Step S702, the first processing unit 111 of the host 110 reads the corresponding item position from the first storage unit 112 according to the item name and outputs the picking signal including the information about the item position through the first communication interface 113. In Step S703, the picking vehicle 120 receives the picking signal from the first communication interface 113 of the host 110 through the second communication interface 123. In Step S704, the second processing unit 121 of the picking vehicle 120 calculates a moving path based on the information about the item position included in the picking signal and the current position of the picking vehicle 120 and generates a corresponding moving signal. In Step S705, the rotary encoder 122 of the picking vehicle 120 drives the wheels according to the moving signal, so that the picking vehicle 120 moves to the item position. In order to drive the picking vehicle 120 to reach the item position more accurately, the positioning correcting unit 124 may be driven to correct the moving path of the picking vehicle 120 every one predetermined distance. The positioning correction unit 124 may perform the correction through a two-dimensional barcode or magnetic track disposed on the moving path. For example, the moving path is corrected, for example, by a two-dimensional barcode or a positional shift of the magnetic track in the image. The predetermined distance can be determined according to the accuracy of the rotary encoder 122. For example, when the accuracy is higher, the predetermined distance is longer; conversely, when the accuracy is lower, the predetermined distance is shorter.

Figure 8A:
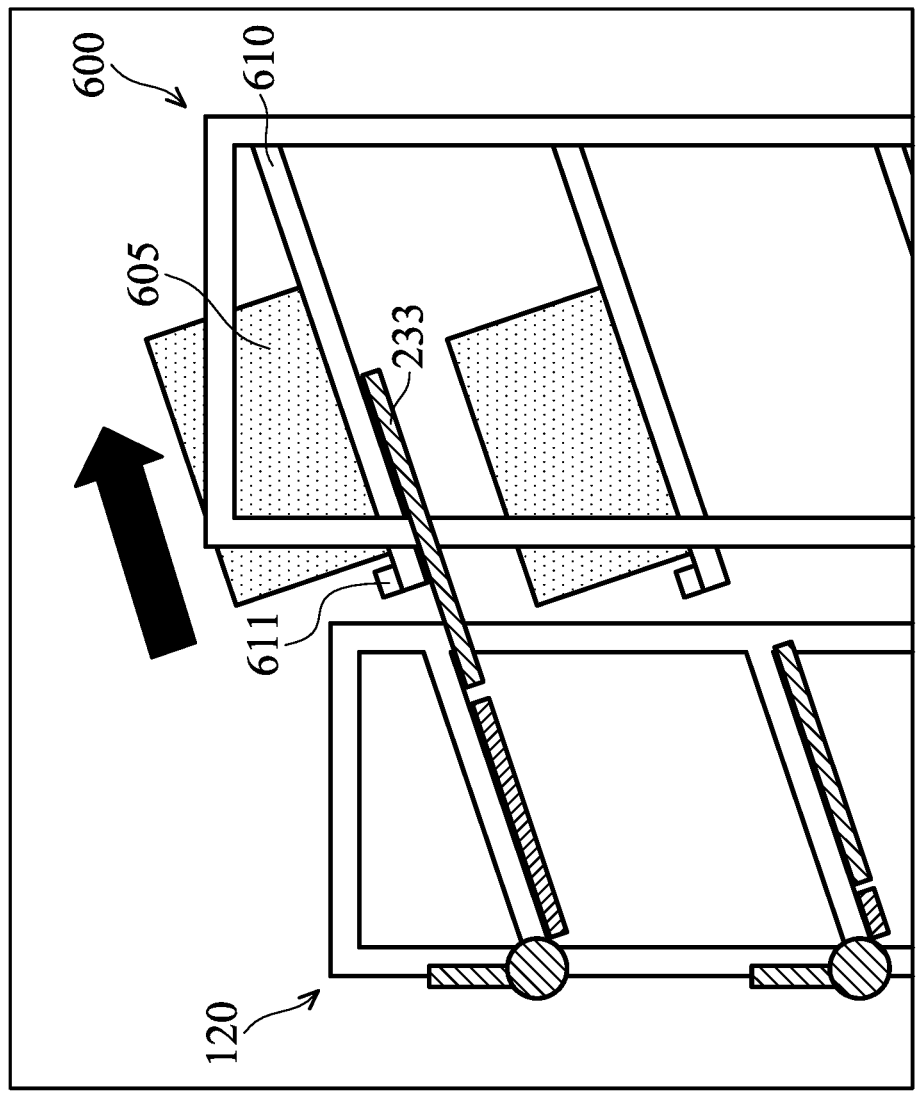
FIGS. 8A~8C are schematic views showing an item picking method according to an embodiment of the disclosure.
Figure 8B:
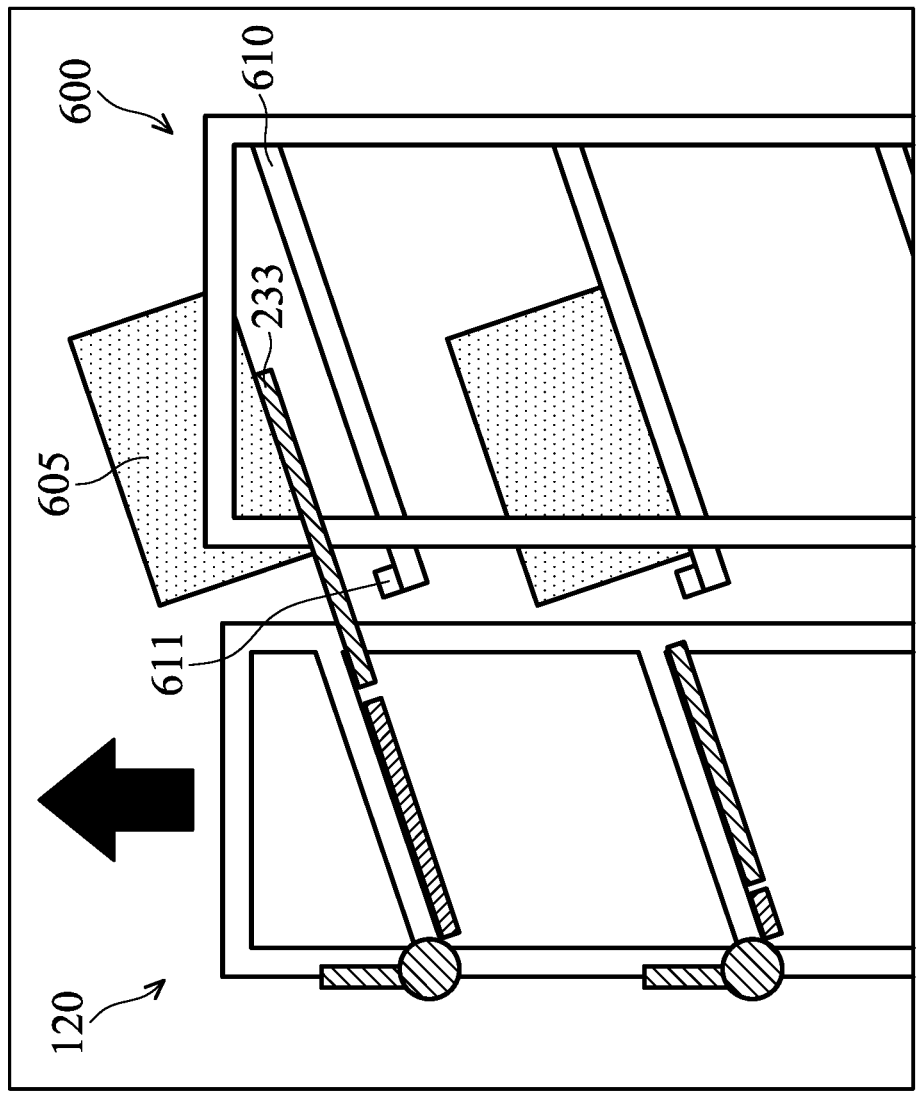
Figure 8C:
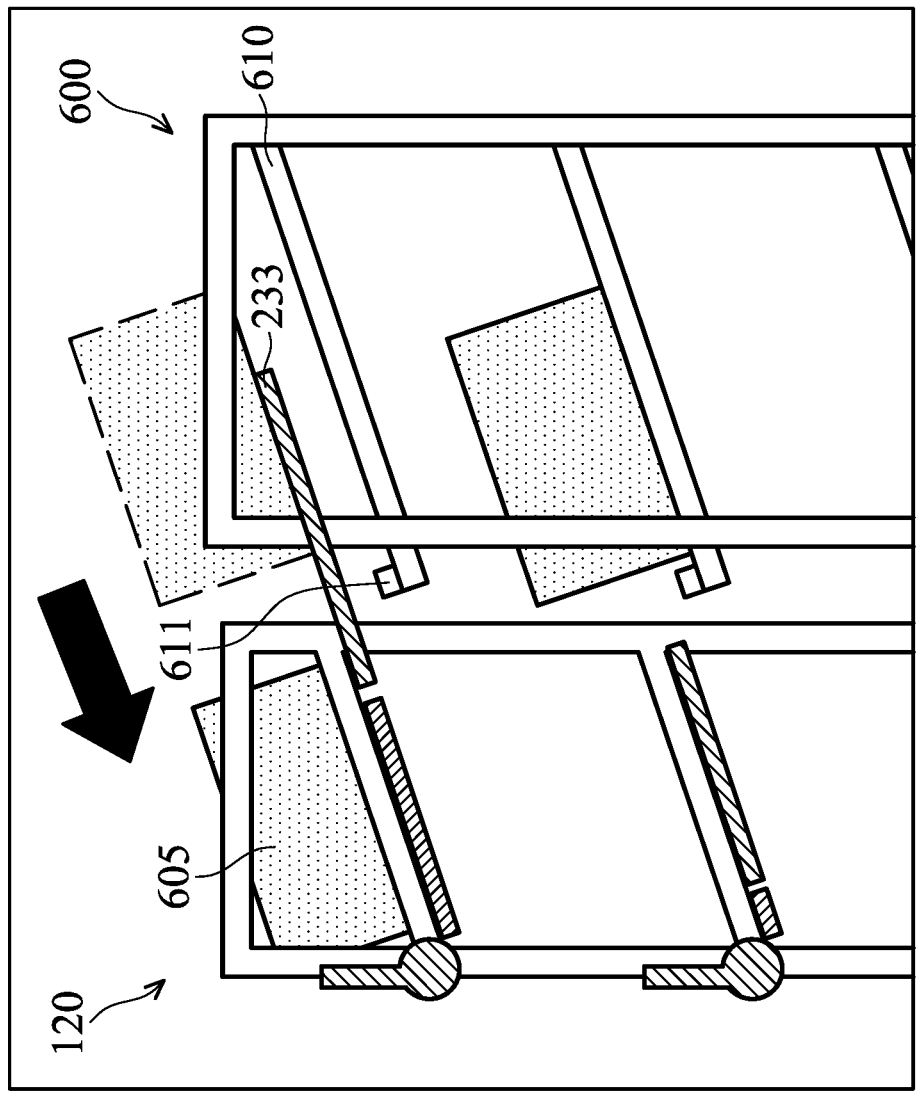

In Step S706, after the picking vehicle 120 reaches the item position, the second processing unit 121 drives the pushing-and-drawing mechanism 235 and the pushing-up mechanism 240 to obtain the item from the shelf. For example, as shown in FIG. 8A, the second processing unit 121 first drives the pushing-and-drawing mechanism 235 to extend the insertion forks 233 below the shelf. Then, as shown in FIG. 8B, the second processing unit 121 drives the pushing-up mechanism 240 to raise the entire placement shelf 230 to raise the item higher than the baffle 611. Finally, as shown in FIG. 8C, the item will slide down onto the placement layer 232 due to gravity and be blocked by the baffle 234. In Step S707, the picking confirmation unit determines that the picking vehicle 200 has obtained the item by detecting the increment in weight or scanning the barcode. In Step S708, the second processing unit 121 determines whether there are other items in the order. If there are still other items, the method returns to Step S704, and the second processing unit 121 of the picking vehicle 120 calculates a moving path based on the information about the item position included in the picking signal and the current position of the picking vehicle 120 and generates a corresponding moving signal. On the other hand, if the second processing unit 121 determines that the entire picking process has been completed, the method proceeds to Step S709, and the second processing unit 121 generates a moving signal according to the current position and the location of the shipping area, so that the picking vehicle 120 moves to the shipping area.

Figure 9:
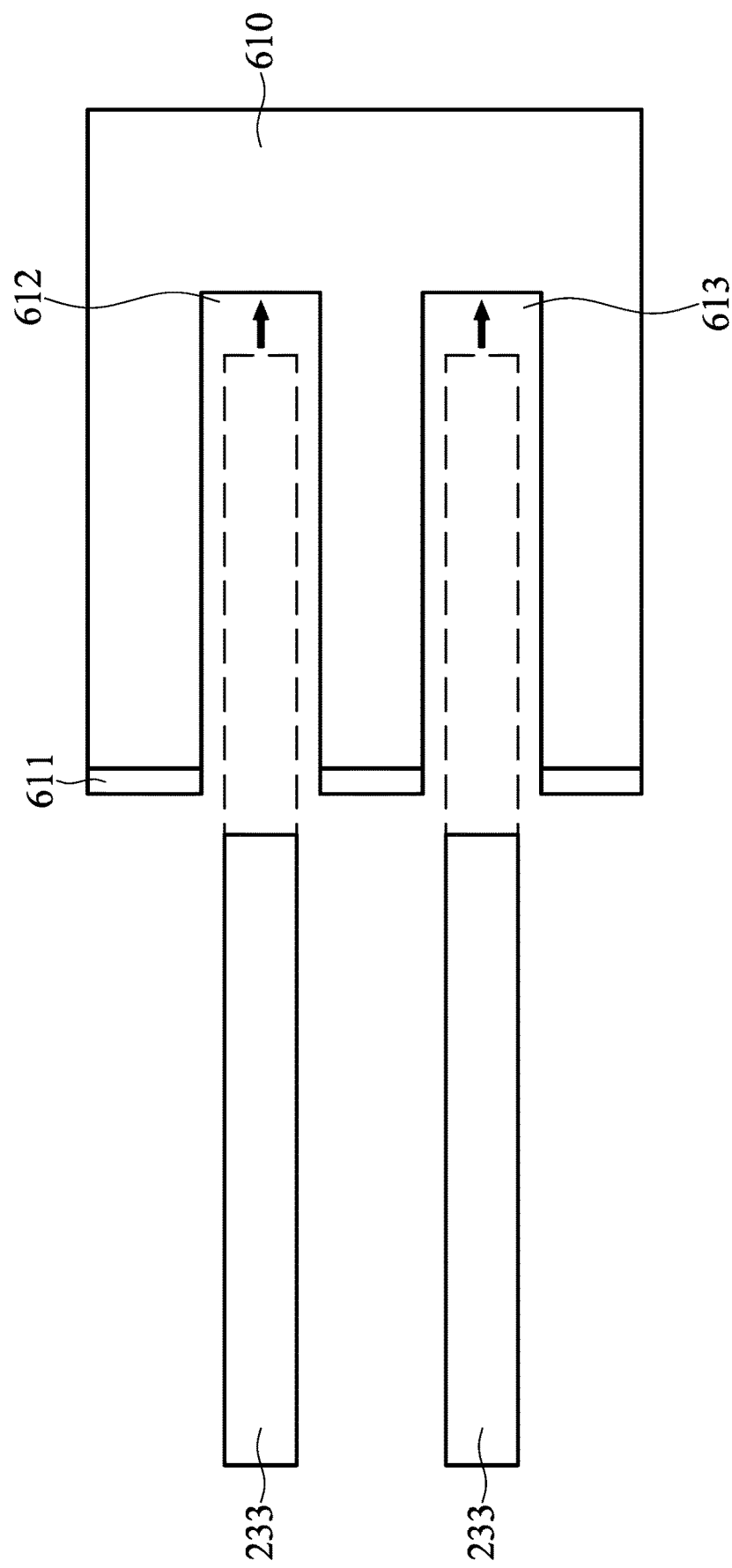
FIG. 9 is a top view of a shelf and insertion forks according to an embodiment of the disclosure.
Figure 10:
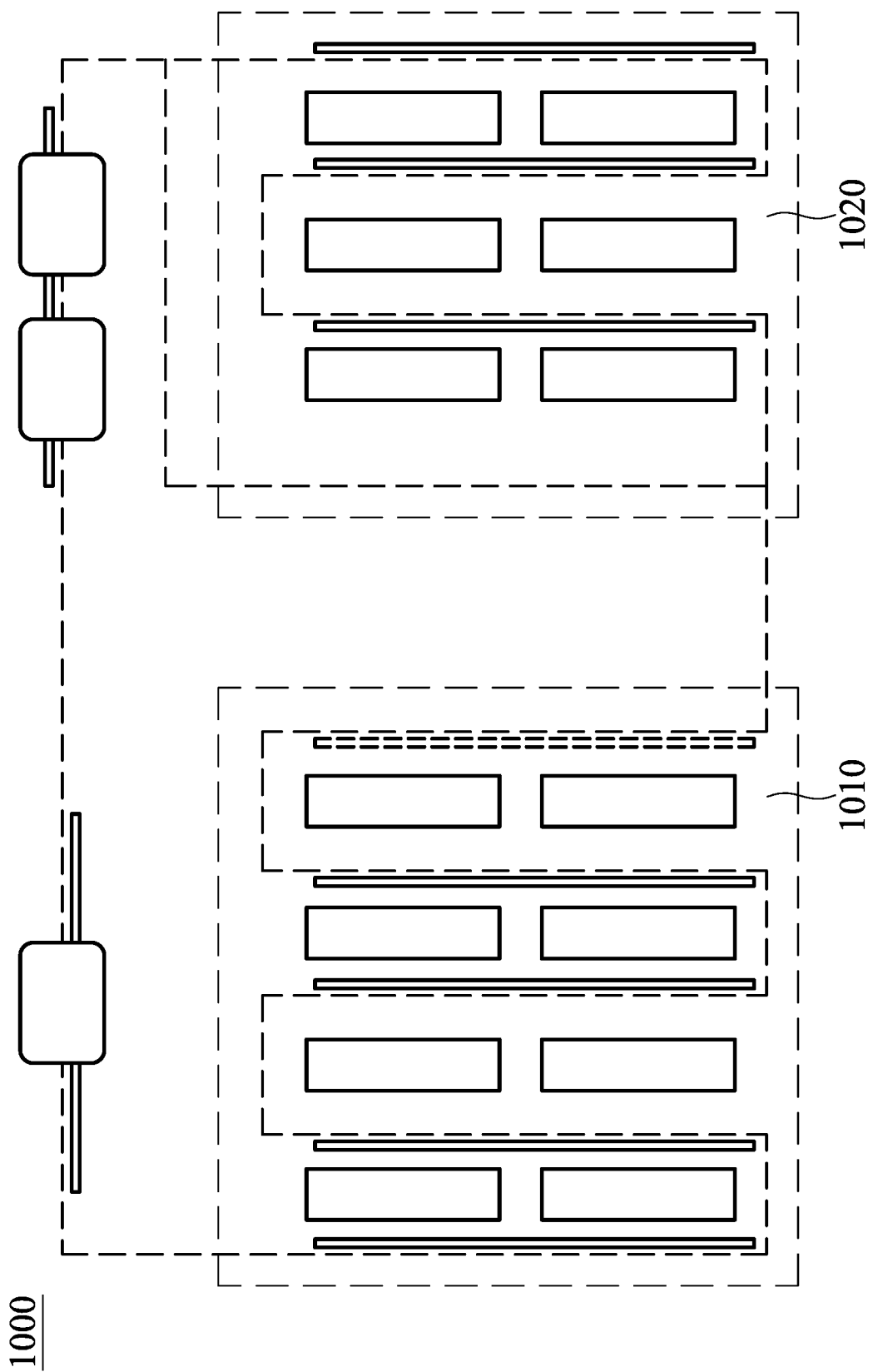
FIGS. 10~12 are schematic views showing an item replenishment method according to an embodiment of the disclosure.

FIG. 9 is a top view of a shelf and insertion forks according to an embodiment of the disclosure. As shown in FIG. 9, the shelf layer 610 has at least two notches 612 and 613, wherein, the width of the notches 612 and 613 is greater than the width of the insertion forks 233, so that the claws 233 can operate in the notches 612 and 613. For example, as shown in FIG. 9, after the picking vehicle 200 reaches the position of the item, the second processing unit 121 drives the pushing-and-drawing mechanism 235 to insert the insertion forks 233 into the notches 612 and 613 and then drive the pushing-up mechanism 240 to raise the item higher than the baffle 611, so that the item slides down onto the placement layer 232. The insertion forks 233 can be made of a material having a smooth surface so that the picked item can be easily slid down onto the placement layer 232.

According to another embodiment of the disclosure, when the size of the item is too small for the picking vehicle 120 to be picked through the insertion forks 233, the picking vehicle 120 can be moved to another item-picking area and the picking is done through manual work of a picking staff. For example, as shown in FIG. 1010, the warehouse 1000 may include a first picking area 1010 and a second picking area 1020. In the first picking area 1010, there is least one tilted shelf for the picking vehicle 120 to pick items through the insertion forks, while in the second picking area 1020, there are a normal shelves for placing small items to be picked by picking staves. When the order contains a small item, the first processing unit 111 of the host 110 may output the item name (and/or the item appearance, etc.) corresponding to the item position to the picking vehicle 120. After the picking vehicle 120 moves to the item position corresponding to the small item in the second picking area 1020, the item name can be displayed on the display unit 125 disposed on the picking vehicle 120 for the picking staves to identify the item to be picked.

Figure 11:
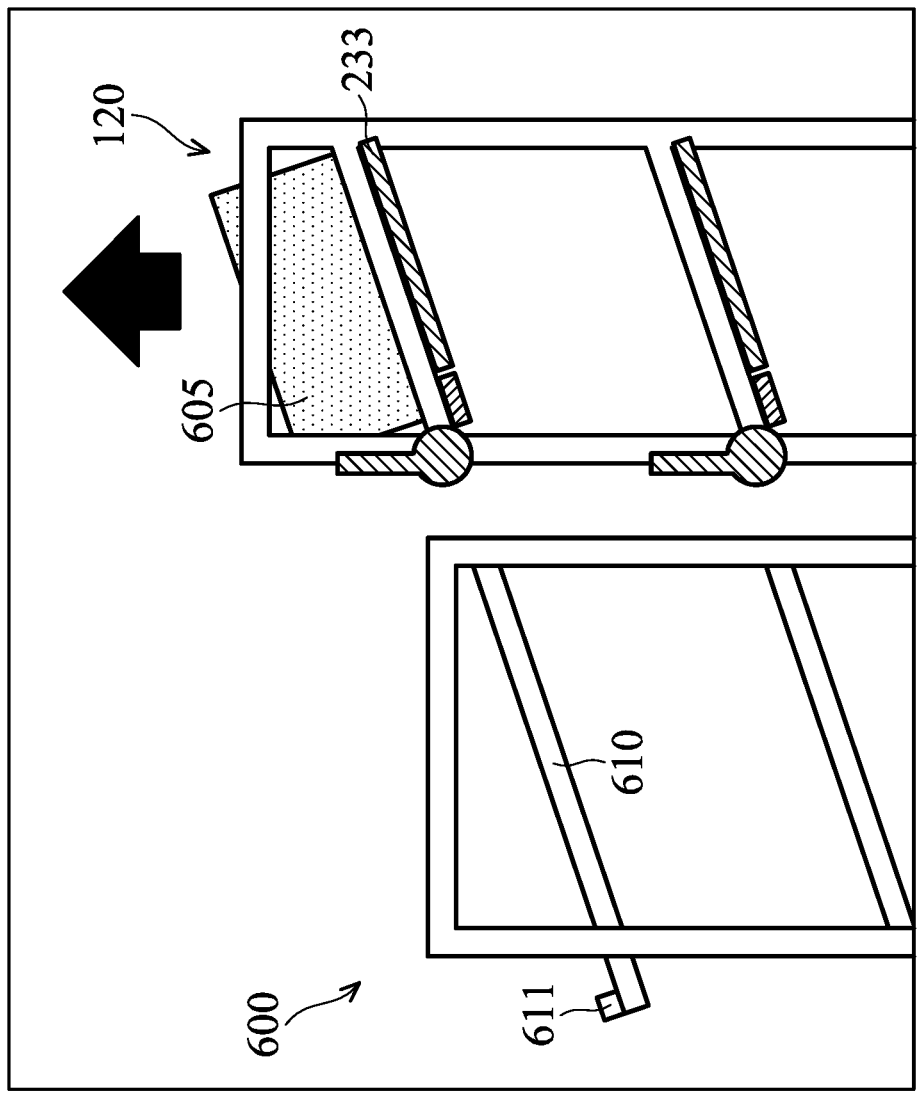
Figure 12:
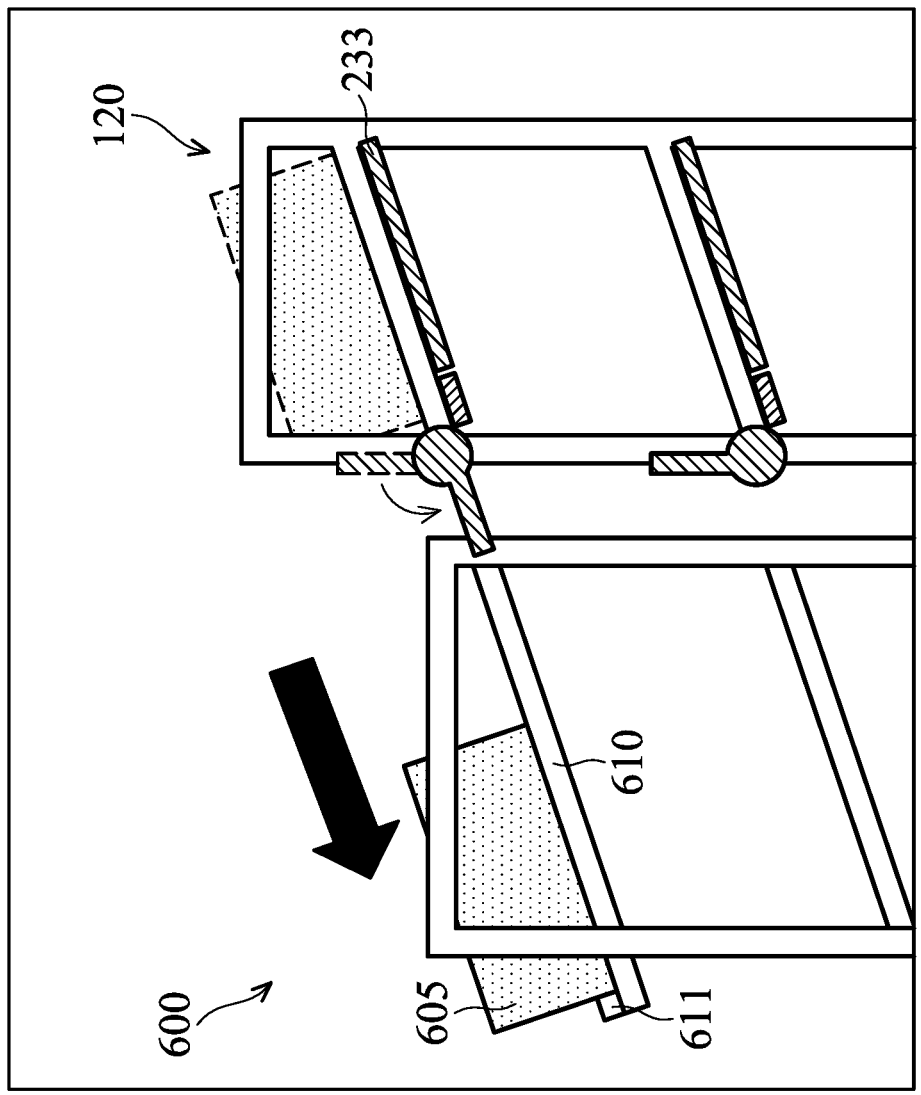

According to another embodiment of the present disclosure, the picking vehicle 120 can perform a replenishment operation. FIGS. 11 and 12 are schematic views showing a replenishment method according to an embodiment of the disclosure. When the picking vehicle 120 performs the replenishment operation, it first moves to a higher side of the item shelf 600, and when it reaches the position of the shelf, the second processing unit 121 first drives the pushing-up mechanism 240 to raise the placement layer 232 of the placement shelf 230, such that the height of the lower side of the placement layer 232 is the same as the height of the higher side of the shelf layer 610 (as shown in FIG. 11). Next, the second processing unit 121 drives the motor 520 to drive the worm 420 such that the baffle 234 lies along the extending direction of the placement layer 232, so that the item will automatically slide down onto the shelf layer 610, and the entire replenishment process is completed (as shown in FIG. 12). When the item slides down from the placement layer 232, the picking confirmation unit can determines that the item leaves the layer 232 by detecting the decrement in weight or scanning the barcode by the barcode scanner, and the determination result is provided for the second processing unit 121 to perform the next operation.

In summary, the item picking and replenishment method, the picking vehicle, and the item picking and replenishment system according to various embodiments of the disclosure may achieve the automation of the picking process by lower cost, which will effectively reduce human resources and time costs. In addition, for smaller items, by concentrating them in a specific picking area, the picking staves can move quickly in the picking area. Since the item information is shown on the display screen of the picking vehicle, the picking staves can find the items more quickly, which may improve picking efficiency.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A picking vehicle comprising:
   a vehicle body disposed on a stage with a plurality of wheels and comprising:
      a rotary encoder, connected to the plurality of wheels, driving the plurality of wheels according to a moving signal to move the picking vehicle to an item position corresponding to at least one item; and
      a processing unit, connected to the rotary encoder, receiving the item position from a host and generating the moving signal according to a current position of the picking vehicle and the item position; and
   a placement shelf composed of at least four brackets and a plurality of placement layers, each placement layer comprising an insertion fork,
   wherein the insertion fork obtains the at least one item from at least one shelf, and each placement layer is a tilted layer.

2. The picking vehicle as claimed in claim 1, wherein the vehicle body further comprises:
   a positioning correction unit, connected to the processing unit, capturing an image that includes a two-dimensional barcode or magnetic track every predetermined distance,
   wherein the processor corrects a moving path of the picking vehicle according to the image through the rotary encoder.

3. The picking vehicle as claimed in claim 1 further comprising:
   a plurality of picking confirmation units, disposed on each of the plurality of placement layers, outputting a confirmation signal to the processing unit when the item slides down onto one of the plurality of placement layers.

4. The picking vehicle as claimed in claim 1 further comprising:
   a pushing-up mechanism disposed between the vehicle body and the placement shelf; and
   a pushing-and-drawing mechanism on an end of each insertion fork;
   wherein when the picking vehicle reaches the item position, the processing unit pushes the insertion fork through the pushing-and-drawing mechanism and drives the pushing-up mechanism to raise the placement shelf to obtain the item.

5. The picking vehicle as claimed in claim 1 further comprising:
   a display screen connected to the processing unit,
   wherein when the picking vehicle reaches the item position, the processing unit drives the display screen to display information about the at least one item.

6. The picking vehicle as claimed in claim 1 further comprising:

a baffle disposed on a bottom terminal of the placement layer; and a worm driving mechanism, connected to the baffle, tilting the baffle according to a unloading signal output by the processing unit to unload the item placed on the placement layer.

7. An item picking and replenishment system comprising:
a host comprising:
   a storage unit storing item information and item positions corresponding to a plurality of items;
   a first processing unit, connected to the storage unit, receiving an order including at least one of the plurality of items and generating a picking signal including at least one of the item positions according to the order and the item positions; and
   a first communication interface outputting the picking signal;
the picking vehicle of claim 1; and
a tilted shelf where the plurality of items are placed.

8. The item picking and replenishment system as claimed in claim 7, wherein the vehicle body further comprises:
a positioning correction unit, connected to the processing unit of the picking vehicle, capturing an image that includes a two-dimensional barcode or magnetic track every predetermined distance,
wherein the processing unit of the picking vehicle corrects a moving path of the picking vehicle according to the image through the rotary encoder.

9. The item picking and replenishment system as claimed in claim 7, wherein the picking vehicle further comprises:
a plurality of picking confirmation units, disposed on each of the plurality of placement layers, outputting a confirmation signal to the second processing unit when the at least one of the plurality of items slides down onto one of the plurality of placement layers.

10. The item picking and replenishment system as claimed in claim 7, wherein the picking vehicle further comprises:
a pushing-up mechanism disposed between the vehicle body and the placement shelf; and
a pushing-and-drawing mechanism on an end of each insertion fork;
wherein when the picking vehicle reaches the at least one of the item positions, the processing unit of the picking vehicle pushes the insertion fork through the pushing-and-drawing mechanism and drives the pushing-up mechanism to raise the placement shelf to obtain the at least one of the plurality of items.

11. The item picking and replenishment system as claimed in claim 7, wherein the picking vehicle further comprises:
a display screen connected to the processing unit of the picking vehicle,
wherein when the picking vehicle reaches the at least one of the item positions, the processing unit of the picking vehicle drives the display screen to display information about the items.

12. The item picking and replenishment system as claimed in claim 7, wherein the picking vehicle further comprises:
a baffle disposed on a bottom terminal of each of the plurality of placement layers; and
a worm driving mechanism, connected to the baffle, tilting the baffle according to a unloading signal output by the processing unit of the picking vehicle to unload the at least one of the plurality of items placed on at least one of the plurality of placement layers.

13. The item picking and replenishment system as claimed in claim 12, wherein when the picking vehicle is located on a first side of the tilted shelf, the picking vehicle obtains the at least one of the plurality of items through the insertion fork, and when the picking vehicle is located on a second side of the tilted shelf, the picking vehicle tilts the baffle through the worm driving mechanism to upload the item placed on the placement layer, and wherein height of the second side is greater than height of the first side.

14. An item picking and replenishment method for the picking vehicle of claim 1, comprising:
outputting the item position corresponding to the at least one item according to an order by the host;
receiving the item position by the processing unit of the picking vehicle;
generating the moving signal by the processing unit according to the current position of the picking vehicle and the item position;
using the rotary encoder of the picking vehicle to move the picking vehicle to the item position according to the moving signal; and
obtaining the item from the at least one shelf by the insertion fork of the picking vehicle.

15. The item picking and replenishment method as claimed in claim 14, further comprising:
capturing an image including a two-dimensional barcode or magnetic track every a predetermined distance by a positioning correction unit of the picking vehicle; and
through the rotary encoder, correcting a moving path of the picking vehicle according to the image by the processing unit.

16. The item picking and replenishment method as claimed in claim 14 further comprising:
when the item is obtained by the insertion fork, outputting a confirmation signal to the processing unit by a picking confirmation unit of the picking vehicle,
wherein the picking confirmation unit is disposed on each placement layer.

17. The item picking and replenishment method as claimed in claim 14, wherein the step of obtaining the item from the shelf by the insertion fork of the picking vehicle comprises:
when the picking vehicle reaches the item position, through a pushing-and-drawing mechanism, pushing the insertion fork by the processing unit and driving a pushing-up mechanism to raise the placement shelf to obtain the item,
wherein the pushing-up mechanism is disposed between the vehicle body and the placement shelf, and
wherein the pushing-and-drawing mechanism is disclosed on an end of the insertion fork.

18. The item picking and replenishment method as claimed in claim 14, further comprising:
when the picking vehicle reaches the item position, driving a display screen by the processing unit to display information about the item.

19. The item picking and replenishment method as claimed in claim 14, further comprising:
tilting a baffle by a worm driving mechanism of the picking vehicle for unloading the item placed on the placement layer,
wherein the worm driving mechanism is disposed on a bottom terminal of the placement layer.

20. The item picking and replenishment method as claimed in claim 19, further comprising:
obtaining the item from a first side of the shelf by the insertion fork of the picking vehicle; and unloading the item placed on the placement layer on a second side of the shelf by tilting the baffle by the worm driving mechanism of the picking vehicle,
wherein height of the second side is greater than height of the first side.

* * * * *